United States Patent
Shimoda et al.

(10) Patent No.: US 8,322,638 B2
(45) Date of Patent: Dec. 4, 2012

(54) METHOD FOR PRODUCING HYDRAULIC POWDER

(75) Inventors: Masaaki Shimoda, Wakayama (JP); Masafumi Shonaka, Shanghai (CN); Toshimasa Hamai, Wakayama (JP); Kenichi Kobata, Chiba (JP)

(73) Assignee: Kao Corporation, Tokyo (JP)

( * ) Notice: Subject to any disclaimer, the term of this patent is extended or adjusted under 35 U.S.C. 154(b) by 56 days.

(21) Appl. No.: 12/667,373

(22) PCT Filed: Aug. 7, 2008

(86) PCT No.: PCT/JP2008/064564
§ 371 (c)(1), (2), (4) Date: Mar. 29, 2010

(87) PCT Pub. No.: WO2009/022716
PCT Pub. Date: Feb. 19, 2009

(65) Prior Publication Data
US 2011/0005432 A1    Jan. 13, 2011

(30) Foreign Application Priority Data

Aug. 10, 2007 (JP) ................................. 2007-210155

(51) Int. Cl.
| | |
|---|---|
| C04B 7/00 | (2006.01) |
| C04B 7/34 | (2006.01) |
| C04B 28/00 | (2006.01) |
| C04B 32/00 | (2006.01) |
| C04B 9/12 | (2006.01) |
| C04B 28/04 | (2006.01) |
| C04B 14/00 | (2006.01) |
| C04B 24/00 | (2006.01) |
| C04B 24/10 | (2006.01) |
| C04B 16/00 | (2006.01) |
| C04B 40/00 | (2006.01) |
| B02C 1/00 | (2006.01) |
| B02C 23/06 | (2006.01) |

(52) U.S. Cl. .......... 241/16; 106/823; 106/638; 106/713; 106/724; 106/802
(58) Field of Classification Search ............ 510/175; 241/16; 106/638, 713, 724, 802, 823
See application file for complete search history.

(56) References Cited

U.S. PATENT DOCUMENTS

| 2,203,809 A | 6/1940 | Bechtold |
| 3,615,785 A | 10/1971 | Moorer et al. |
| 2006/0032409 A1* | 2/2006 | Okazawa et al. ............. 106/810 |
| 2006/0169177 A1 | 8/2006 | Jardine et al. |
| 2006/0272554 A1* | 12/2006 | Jardine et al. .................. 106/823 |

FOREIGN PATENT DOCUMENTS

| JP | 48-42697 B1 | 12/1973 |
| JP | 54-43188 A | 4/1979 |
| JP | 57-88046 A | 6/1982 |
| JP | 57-100952 | 6/1982 |
| JP | 59-78961 A | 5/1984 |
| JP | 62-87441 A | 4/1987 |
| JP | 3-187958 A | 8/1991 |
| JP | 5-147984 A | 6/1993 |
| JP | 7-33487 A | 2/1995 |
| JP | 11-60298 | 3/1999 |
| JP | 11-157891 A | 6/1999 |
| JP | 11-322380 | 11/1999 |
| JP | 2980752 B2 | 11/1999 |
| JP | 2001-58855 A | 3/2001 |
| JP | 2002-160959 A | 6/2002 |
| JP | 2005-89287 A | 4/2005 |
| WO | WO 2005/076858 A2 | 8/2005 |

OTHER PUBLICATIONS

Chinese Office Action dated Feb. 6, 2012 for Application No. 200880102846.9.
CN-A 85 104 833 corresponding to JP-A 62-087441, 1985.
"Glycerol, ethoxylated, CAS # 31694-55-0," Werner Blank, Jul. 6, 2006, XP-002676940, <http://www.wernerblank.com/polyur/chemistry/polyether/cas31694550.htm>.
Supplementary Partial European Search Report for corresponding European Patent Application No. 08827359.4, dated Jul. 25, 2012.

* cited by examiner

Primary Examiner — Anthony J Green
Assistant Examiner — Karam Hijji
(74) Attorney, Agent, or Firm — Birch, Stewart, Kolasch & Birch, LLP

(57) ABSTRACT

In the invention, a hydraulic powder is prepared by a step of grinding a hydraulic compound in the presence of compound (a) that is obtained by adding an alkyleneoxide having 2 to 4 carbon atoms to a compound which has no amino group, but has an active hydrogen, provided that polyethyleneglycol and polypropyleneglycol are excluded. Alternatively, the hydraulic compound can be ground in the presence of compound (a) and anti-foaming agent (b).

6 Claims, No Drawings

METHOD FOR PRODUCING HYDRAULIC POWDER

FIELD OF THE INVENTION

The present invention relates to a method for preparing a hydraulic powder.

BACKGROUND OF THE INVENTION

Hydraulic compound, for example, Portland cement clinker, blast-furnace slag and the like are ground to give various types of hydraulic powder. For instances, Portland cement is produced by calcining raw materials such as limestone, clay or iron scraps to obtain clinker, adding an appropriate amount of gypsum and grinding the mixture. In this case, in order to increase efficiency for grinding, a grinding aid such as diethylene glycol or triethanolamine is used. For a grinding process, it is desirable that hydraulic compounds are prepared efficiently as much as possible in a desired particle size. For such reasons, a grinding aid has been used for a conventional grinding process.

With respect to a grinding aid, oligomers of lower alkyleneglycol such as propyleneglycol or diethyleneglycol (for example, see JP-A 7-33487, JP-A 11-157891 and JP-A 11-322380), alkanolamines such as triethanolamine (for example, see JP-A 2002-160959), fatty acids such as stearic acid or aromatic compounds such as phenol (for example, see JP-A 5-147984), and hydroxyalkylhydrazine or tertiary butyl acetic acid and the like (for example, see JP-A 11-60298) are known. In addition, it has been also known that glycerin is used as a grinding aid (for example, see JP-A 5-147984 and JP-A 11-60298), lignin sulfonic acid salt is used in combination with glycerin (for example, see, JP-A 57-100952), and organic plant wastewater including polyhydric alcohols is used (for example, see JP-A 2005-89287). In particular, it is known that diethyleneglycol or triethanolamine has a good grinding efficiency and also can be prepared in a desired particle size at a relatively high speed.

Meanwhile, there is a problem of quality deterioration due to a decreased strength of cement, depending on conditions for production and preservation thereof. The reason for such decrease of strength includes weathering of cement that is caused by moisture released from binding water of dihydrate gypsum included in cement when the cement is stored in a silo or etc. at a high temperature, or weathering of cement caused by moisture contained in air when the cement is transferred with air. As a means to cope with such problems, it is described as an effective method in JP-A 3-187958 that silicone oil is added for grinding and manufacturing cement.

SUMMARY OF THE INVENTION

The present invention relates to a method for preparing a hydraulic powder, including a step of grinding a hydraulic compound in the presence of compound (a) that is obtained by adding an alkyleneoxide having 2 to 4 carbon atoms to a compound which has no amino group, but has an active hydrogen, provided that polyethyleneglycol and polypropyleneglycol are excluded (herein after, referred to as compound (a)).

The present invention relates to a method for preparing a hydraulic powder, including a step of grinding a hydraulic compound in the presence of compound (a), that is obtained by adding an alkyleneoxide having 2 to 4 carbon atoms to a compound which has no amino group, but has an active hydrogen, provided that polyethyleneglycol and polypropyleneglycol are excluded, and an anti-foaming agent (b).

Further, the present invention relates to a grinding aid for a hydraulic having compound (a1) that is obtained by adding 0.5 to 6 moles on the average of alkyleneoxides having 2 to 4 carbon atoms to glycerin (herein after, referred to as compound (a1)).

Further, the present invention relates to a grinding aid for a hydraulic compound, containing compound (a1'), (herein after, referred to as compound (a1')), that is obtained by adding 3 to 12 moles on the average of alkyleneoxides having 2 to 4 carbon atoms to glycerin and an anti-foaming agent (b).

The present invention further relates to a hydraulic powder that can be obtained by any one of the methods of preparation described above.

DETAILED DESCRIPTION OF THE INVENTION

The use of diethyleneglycol, which is widely employed as a grinding aid for hydraulic compounds, is significantly limited since its influence on safety or health may be considered when it is used. Meanwhile, triethanolamine may not be also freely used in future, since it is one of the second-class designated materials under Law Prohibiting Production, Distribution and Possession of Chemical Weapons. As such, development of a new compound that can substitute triethanolamine is in need.

Meanwhile, glycerin, which has been long known as a grinding aid for hydraulic compounds (see, JP-A 5-147984 and JP-A 11-60298), has a guaranteed safety as being originated from natural fatty components compared to diethyleneglycol and triethanolamine. However, having high liquid viscosity, handling properties and efficiency of initial grinding tend to be poor.

In addition, silicone oil, that is believed to be capable of inhibiting a reduction in strength of cement due to deterioration, is known to form an oil film on the surface of cement particles to exhibit a water-repellant effect. As such, there is a concern regarding its influence on a hydration reaction of cement particles, especially its influence on a curing time for exhibiting an initial hydration reaction. In addition, since an oily material such as silicone oil and the like has a anti-forming effect, it is expected that the preparation of a hydraulic composition including air such as air bubble mortar or AE concrete and the like is difficult.

The present invention provides a method for preparing a hydraulic powder, which can guarantee the safety of a grinding aid and reduce time for obtaining a desired particle size as having a good grinding efficiency, and can produce a hydraulic powder, such as cement, suppressed from strength reduction due to deterioration.

According to the present invention, a method for preparing a hydraulic powder is provided, which can guarantee the safety of a grinding aid and reduce time for obtaining a desired particle size as having a good grinding efficiency during the grinding process, and can produce a hydraulic powder, such as cement, suppressed from strength reduction due to deterioration. According to the present invention, the strength reduction due to an increase in the airflow amount or deterioration can be suppressed.

The hydraulic compound of the present invention includes a material which has a curing property with reaction with water and a compound which has no curing property by itself. It also includes, when two or more kinds are used in combination, a compound which can form a hydrate based on an interaction between the two or more kinds through water and be cured. Generally, when a hydraulic compound, for example cement clinker, is ground, intercrystalline fracture and transcrystalline fracture can occur. In case of transcrystalline fracture, an ionic bond between Ca—O is broken so that a surface carrying excessive cations ($Ca^{2+}$) and a surface carrying excessive anions ($O^{2-}$) are produced. In addition, a distance that is under the influence of an electrostatic force is shortened due to an impact by a grinder to yield agglomeration. As a result, grinding efficiency becomes poor. It is believed that a grinding aid increases grinding efficiency by reducing surface energy of fractured surface of particles to inhibit agglomeration.

According to the present invention, by having compound (a) present at the time of grinding hydraulic compounds, the compounds can be ground quickly to a desired particle size. Although a detailed mechanism remains uncertain, it is estimated that the liquid viscous property (viscosity) of compound (a) as a grinding aid is lowered to increase a spreading and wetting property over the to-be-ground materials. As a result, it can be more quickly and homogeneously adhered to the to-be-ground materials so that the grinding efficiency is improved. According to the present invention, by having compound (a) and anti-foaming agent (b) present at the time of grinding hydraulic compounds, the compounds can be ground quickly to a desired particle size. Although a detailed mechanism remains uncertain, it is estimated that compound (a) as a grinding aid can be more quickly and homogeneously adhered to the to-be-ground materials so that grinding efficiency is improved. It is considered that this improvement is due to facts that the liquid viscous property (viscosity) of compound (a) is so low as to increase a spreading and wetting property over the to-be-ground materials.

Further, by grinding hydraulic compounds in the presence of compound (a) having a water-retaining property, it is estimated that the weathering of the hydraulic compounds is suppressed and also the strength reduction of the hydraulic powder due to deterioration can be suppressed.

Compound (a) is an adduct of an alkyleneoxide having 2 to 4 carbon atoms with no amino group for safety but with an active hydrogen (provided that polyethyleneglycol and polypropyleneglycol are excluded), and preferably is a compound with a fixed viscosity. Example of a compound that has no amino group but has an active hydrogen includes alcohols, sugars and organic acids (preferably fatty acids). In terms of an adsorption property to a fracture surface of minerals, alcohols are preferred. With respect to alcohols, monohydric alcohols including a hydrocarbon group having 3 to 20 carbon atoms (preferably an alkyl group), and polyhydric alcohols having 2 to 25 hydroxyl groups (preferably polyhydric alcohols having 3 to 10 carbon atoms and 2 to 6 hydroxyl groups) can be mentioned. With respect to alkyleneoxides, ethyleneoxide, propyleneoxide, and butyleneoxide can be mentioned. Ethyleneoxide and propyleneoxide are preferred. Ethyleneoxide is more preferred.

Number of hydroxyl groups included in polyhydric alcohols is preferably two or more, and more preferably three or more. Further, it is preferably 25 or less. When it is two or more, the functional activity of compound (a) is fully exerted. When it is 25 or less, the molecular weight of compound (a) becomes appropriate and its functional activity is fully exerted even with a small additive amount. Further, the number of hydroxyl groups included in compound (a) is preferably 20 or less, more preferably 10 or less, and even more preferably 6 or less.

Further, number of carbon atoms included in compound (a) is preferably four or more, more preferably five or more, and even more preferably six or more. A more preferred type of compound (a) is those obtained from the compounds in which polyhydric alcohols having three elements of a carbon, a hydrogen and an oxygen.

With respect to polyhydric alcohols, polyglycidol, glycerin, diglycerin, polyglycerin, trimethylolethane, trimethylolpropane, 1,3,5-pentatriol, erithritol, pentaerithritol, dipentaerithritol, sorbitol, sorbitan, sobitolglycerin condensate, adonitol, arabitol, xylitol, and mannitol are preferred. With respect to sugars, hexose sugars such as glucose, fructose, mannose, indose, sorbose, gulose, talose, tagatose, galactose, allose, psicose or altrose; pentose sugars such as arabinose, ribulose, ribose, xylose, xylulose or lyxose; tetrose sugars such as threose, erythrulose or erythrose; other sugars such as rhamnose, cellobiose, maltose, isomaltose, trehalose, sucrose, raffinose, gentianose or melezitose; and sugar alcohols thereof and sugar acids thereof (sugar; glucose, sugar alcohol; glucid, sugar acid; gluconic acid) are also preferred. In addition, derivatives such as a partially etherified or a partially esterified compound of the exemplified compounds are also preferred. These compounds can be used alone or in combination of two or more. Among them, in the present invention, sorbitol, polyglycerin and glycerin are preferred, and glycerin is more preferred. With respect to polyglycerin, the degree of condensation for glycerin is preferably 2 to 5, more preferably 2 to 4 and even more preferably 2 to 3.

In terms of improving the grinding efficiency by lowering a surface energy of fractured surfaces of particles, compound (a) is preferably an adduct obtained by adding 0.5 to 6 moles on the average, more preferably 1 to 5 moles, even more preferably 1 to 4 moles, of alkyleneoxide to one mole of a compound having an active hydrogen.

With respect to the grinding aid having compound (a), an alkyleneoxide adduct of alcohols having 2 to 4 carbon atoms is preferred, and an alkyleneoxide adduct of glycerins having 2 to 4 carbon atoms, and ethyleneoxide (hereinafter, described as EO) and/or propyleneoxide (hereinafter, described as PO) adduct of glycerins is preferred. When there are two or more of alkyleneoxides, it can have a block shape or a random shape. Among the alkyleneoxide adduct of glycerins, compound (a1) that is obtained by adding on average 0.5 to 6 moles of alkyleneoxide having 2 to 4 carbon atoms to glycerin is preferred. The average added mole number of alkyleneoxide in compound (a1) is 1 to 5, more preferably 1 to 4. With respect to compound (a1), alkyleneoxide is preferably EO and/or PO. The average added mole number of EO and/or PO is 0.5 to 6 moles, preferably 1 to 5 moles, and more preferably 1 to 4 moles per one mole of glycerin. Compound (a1) is preferably a compound obtained by adding EO in the average amount of 0.5 to 6 moles, more preferably 1 to 5 moles, even more preferably 1 to 4 moles, to glycerin.

Compound (a) can be obtained by adding an alkyleneoxide having 2 to 4 carbon atoms to a compound which has no amino group but has an active hydrogen excluding water, ethyleneglycol and propyleneglycol. The method for producing the compound can be carried out in accordance with publicly known methods.

Portland cement is typically prepared as a powder having a specific surface area, i.e., Blaine value, of 2,500 $cm^2/g$ or more, produced by pre-grinding clinker (also referred to as 'cement clinker', sometimes containing gypsum), which clinker is a hydraulic compound obtainable by calcining raw materials such as limestone, clay or metal scraps, adding an appropriate amount of gypsum and grinding for finishing. Compound (a) of the present invention is used as a grinding aid for the grinding, or preferably as a grinding aid for the finishing grinding. Compound (a) is preferably used in an amount of 0.001 to 0.2 parts by weight, or more preferably in an amount of 0.005 to 0.1 parts by weight, to 100 parts by weight of hydraulic compound, especially cement clinker, to obtain fast grinding with desired particle size. Grinding a hydraulic compound, particularly clinker, more particularly finishing grinding, is preferably performed after adding compound (a) to raw materials including a hydraulic compound, particularly clinker. The addition method includes dropping or drizzling a liquid of compound (a) or a mixture including compound (a) and other components.

In the present invention, compound (a) is preferably a liquid having low viscosity, in terms of easy handling and grinding efficiency. Specifically, a liquid compound which has viscosity of 1,000 mPa·s or less at 25° C. is preferred. The viscosity is measured by using VISCOMETER (BM type; manufactured by Tokyo Keiki Kogyo Co., Ltd.). Further, in terms of easy handling, compound (a) can be prepared and used as an aqueous solution. In this case, the concentration of compound (a) is preferably 50 to 99% by weight. Using an aqueous solution of compound (a) is so important that it can facilitate a quick and homogeneous spreading of compound (a) over a hydraulic compound. However, since when it is in contact with a hydraulic compound, the water included in an aqueous solution is quickly absorbed by or react with the hydraulic compound so that compound (a) is concentrated at relatively early stage of grinding. As a result, being in a state of almost 100% product, it co-exists with the hydraulic compound to proceed with grinding. For such reasons, it is important for compound (a) itself to have low viscosity in order to obtain an effect of grinding. In this connection, a grinding aid such as glycerin which has high intrinsic viscosity is not alone suitable for obtaining an improvement in grinding efficiency at actual equipment level.

According to the present invention, conditions for grinding can be adjusted to obtain powder having an appropriate particle size depending on raw materials, use and the like. In general, it is preferable that a hydraulic compound, especially clinker, is ground until it becomes to have specific surface area, i.e., Blaine value, of 2,500 to 5,000 cm$^2$/g.

A grinding apparatus used for grinding a hydraulic compound, particularly clinker, more particularly for finishing grinding is not specifically limited. However, example thereof includes a ball mill which is generally used for grinding cement and the like. The material for grinding mediums of the apparatus (grinding ball) desirably has hardness that is the same or more than that of a material to be ground (for example, calcium aluminate for cement clinker). Commercially available product includes, for instances, alumina, zirconia, titania, tungsten carbide and the like.

Compound (a) of the present invention, in particular compound (a1), is preferred as a grinding aid for a hydraulic compound, especially for clinker. That is, a method of grinding a hydraulic compound, especially clinker, by using compound (a1) as a grinding aid for grinding a hydraulic compound, especially clinker, more especially for finishing grinding, is provided. In this case compound (a1) is used preferably in an amount of 0.001 to 0.2 parts by weight, more preferably 0.005 to 0.1 parts by weight, and even more preferably 0.02 to 0.06 parts by weight, to 100 parts by weight of a hydraulic compound, especially clinker. Alkyleneoxide that is added in compound (a1) is preferably EO and/or PO.

The grinding aid of the present invention can be used in combination of two or more. Further, it can be used in combination with other grinding aid. For example, other grinding aid can be used in an amount of 40% by weight or less to the total weight of the grinding aid. In terms of easy handling, other grinding aid is a compound which has lower viscosity than that of compound (a). Diethylene glycol or triethanolamine which is effective for lowering viscosity even in a small amount, or glycerin as a natural component for ensuring safety can be also used. As such, the present invention provides a grinding aid containing compound (a), especially compound (a1), and glycerin. In this case, the weight ratio between compound (a) and glycerin is preferably 99/1 to 50/50 (compound (a)/glycerin), and more preferably 99/1 to 70/30. According to the preparation method of the present invention, it is preferable that a hydraulic compound is ground in the presence of compound (a) and glycerin, and in the case the weight ratio between compound (a) and glycerin is preferably within the range. In addition, glycerin is used preferably in an amount of 0.0001 to 0.05 parts by weight, more preferably 0.001 to 0.03 parts by weight, and even more preferably 0.005 to 0.02 parts by weight, to 100 parts by weight of a hydraulic compound, especially clinker.

The hydraulic powder obtained with the preparation method of the present invention is suppressed from the strength reduction caused by deterioration. Hydraulic powder includes, Portland cement, blast-furnace slag, alumina cement, fly ash, limestone and gypsum. The hydraulic compound that is subjected to grinding is a raw material for these hydraulic powders.

When the preparation is carried out in the presence of anti-foaming agent (b), in order to suppress the weathering of a hydraulic compound, compound (a) is a compound wherein on average 2 to 30 moles, preferably 3 to 20 moles, more preferably 3 to 12 moles of alkyleneoxide are added per one mole of a compound having an active hydrogen. In addition, in order to maintain both the strength and inhibition on weathering, compound (a) is a compound wherein preferably on average 2 to 4 moles, more preferably 3 to 4 moles of alkyleneoxide are added per one mole of a compound having an active hydrogen.

When the preparation is carried out in the presence of anti-foaming agent (b), among alkyleneoxide adduct of glycerin, compound (a1) that is obtained by adding on average 3 to 12 moles of alkyleneoxide having 2 to 4 carbon atoms to glycerin is preferred. In addition, the average added mole number of alkyleneoxide in compound (a1) is preferably 3 to 9, more preferably 3 to 6. With respect to compound (a1), EO and/or PO is preferred for alkyleneoxide. Average added mole number of EO and/or PO is preferably 3 to 12, more preferably 3 to 9, and even more preferably 3 to 6 per one mole of glycerin. With respect to compound (a1), the compounds that are obtained by adding EO in an average amount of 3 to 12 moles, preferably 3 to 9 moles, more preferably 3 to 6 moles per glycerin are preferred.

According to the present invention, anti-foaming agent (b) can suppress the strength reduction that is caused by increased amount of air in a hydraulic composition due to compound (a). By having anti-foaming agent (b) in a preparing process of a hydraulic powder, it is homogeneously distributed over the hydraulic powder so that the above shown suppressing effect can be obtained. As such, a method for the preparation of a hydraulic powder is provided by using both compound (a) and anti-foaming agent (b) in combination to shorten time for obtaining a desired particle size, while maintaining the safety of the grinding aid, so that the grinding efficiency is good and the hydraulic powder, such as cement, is suppressed from the strength reduction caused by an increased amount of air or deterioration.

With respect to anti-foaming agent (b), a silicon anti-foaming agent, a fatty acid ester anti-foaming agent, and an ether anti-foaming agent are preferred. With respect to the silicon anti-foaming agent, dimethylpolysiloxane is more preferred. A polyalkyleneglycol fatty acid ester and a polyalkyleneglycol ether are more preferred for the fatty acid ester anti-foaming agent and the ether anti-foaming agent, respectively.

With respect to silicon anti-foaming agent, an emulsified type that is compatible with water is preferred. Such emulsified type anti-foaming agent includes commercially available products such as KM-70 and KM-73A (both are manufactured by Shin-Estu Chemical Co., Ltd.), TSA series (Momentive Performance Materials Japan LLC), FS anti-foam series (Dow Corning Toray Co., Ltd.) or Anti-foam E-20 (Kao Corporation).

With respect to fatty acid ester anti-foaming agent, Rheodol TW-L120 (Kao Corporation), Neofix, Foamlex (both are manufactured by NICCA CHEMICAL CO., LTD)) and the like, that include polyalkylglycol fatty acid ester as a main component, can be mentioned.

With respect to ether anti-foaming agent, commercially available products such as polyoxypropylene (average added mole number of 3) laurylether [anti-foaming agent No. 8, Kao Corporation], polyoxypropylene (average added mole number of 3) polyoxyethylene (average added mole number of 1) laurylether [anti-foaming agent No. 11, Kao Corporation] as polyalkyleneglycolether or SN defoamer 15-P, Foamaster PC [both are manufactured by San Nopco Limited.], Adeka Pluronic series [ADEKA Corporation] and the like can be mentioned.

With respect to anti-foaming agent (b), fatty acid ester anti-foaming agent is preferred in consideration that it can be useful for suppressing strength reduction. The weight ratio between compound (a) and anti-foaming agent (b) is preferably (a)/(b)=99/1 to 50/50, more preferably 97/3 to 60/40, and even more preferably 95/5 to 70/30 in terms of suppressing strength reduction. Further, the weight ratio between compound (a) and anti-foaming agent (b) is calculated based on their effective amount (solid amount).

Portland cement is typically prepared as a powder having a specific surface area, i.e., Blaine value, of 2,500 $cm^2/g$ or more, produced by pre-grinding clinker (also referred to as 'cement clinker', sometimes containing gypsum), which clinker is a hydraulic compound obtainable by calcining raw materials such as limestone, clay or metal scraps, adding an appropriate amount of gypsum and grinding for finishing. Compound (a) and anti-foaming agent (b) of the present invention are used as a grinding aid for the grinding, or preferably as a grinding aid for the finishing grinding. That is, a method for grinding a hydraulic compound, for example clinker, in which compound (a), particularly compound (a1), and anti-foaming agent (b) are used for grinding a hydraulic compound, particularly clinker, more particularly for finishing grinding, is provided. In this case, in order to obtain relatively fast grinding with desired particle size, compound (a), especially compound (a1'), is preferably used in an amount of 0.001 to 0.2 parts by weight, more preferably in an amount of 0.005 to 0.1 parts by weight, or even more preferably in an amount of 0.02 to 0.06 parts by weight and anti-foaming agent (b) is used in an amount of 0.0001 to 0.1 parts by weight, more preferably in an amount of 0.0005 to 0.05 parts by weight, or even more preferably in an amount of 0.001 to 0.03 parts by weight, to 100 parts by weight of a hydraulic compound, for example, clinker. The alkyleneoxide that is added to compound (a1) is preferably EO and/or PO, while EO is more preferred. Further, the method for the addition to a hydraulic compound includes dropping or drizzling a liquid mixture including compound (a) and anti-foaming agent (b) or a liquid mixture including compound (a), anti-foaming agent (b) and other components.

In terms of easy handling, compound (a) and anti-foaming agent (b) can be used in a form of an aqueous solution. In this case, the concentration of compound (a) is preferably 50 to 99% by weight. The concentration of anti-foaming agent (b) is preferably 0.5 to 44.5% by weight. The use of an aqueous solution including compound (a) and anti-foaming agent (b) is important in that it can facilitate wide and homogeneous spread of compound (a) and anti-foaming agent (b) over a hydraulic compound. However, since when it is in contact with a hydraulic compound the water included in an aqueous solution is quickly absorbed by the hydraulic compound so that compound (a) and anti-foaming agent (b) are concentrated at relatively early stage of grinding. As a result, being present in very high solid concentration, they co-exist with a hydraulic compound to proceed with grinding. For such reasons, it is important for compound (a) itself to have low viscosity in order to obtain an effect of grinding. In this connection, a grinding aid such as glycerin which has high intrinsic viscosity is not alone suitable for obtaining an improvement in grinding efficiency at actual equipment level.

According to the present invention, conditions for grinding can be adjusted to obtain powder having an appropriate particle size depending on raw materials, use and the like. In general, it is preferable that a hydraulic compound, especially clinker, is ground until it becomes to have specific surface area, i.e., Elaine value, of 2,500 to 5,000 $cm^2/g$.

For the grinding aid of the present invention, compound (a) and anti-foaming agent (b) can be used in combination of two or more, respectively. In addition, as it has been described above, it can be used in combination with other grinding aid.

EXAMPLES

Herein below, the embodiments of the present invention are described with reference to the following examples. However, it is evident that the examples are to be considered as an exemplification only and are not intended to limit the present invention.

Example 1 and Comparative Example 1

Materials as described below are prepared in blending quantity as described below and added at once, and then ground by ball mill. In this case, grinding efficiency (time to reach ground state) and strength test of thus-obtained cement were evaluated as described below. Results are given in Table 1.

(1-1) Used Materials

Clinker: Clinker for general Portland cement, obtained by combining limestone, clay, silicate, iron oxide raw materials and the like to have composition of CaO: about 65%, $SiO_2$: about 22%, $Al_2O_3$: about 5%, $Fe_2O_3$: about 3%, MgO and others: about 3% (base on weight), calcining, and grinding them first by using a crasher and a grinder Dihydrate gypsum: Dihydrate gypsum having $SO_3$ in an amount of 44.13%

Grinding aid: see, Table 1 and Preparation Example described below

Preparation Example 1

Preparation of an Adduct Having on Average One Mole of EO Per Glycerin

To a 2-liter autoclave, glycerin and KOH were added (230.3 g and 1.4 g, respectively) and the temperature was raised to 130° C. while stirring at a speed of about 600 rpm. Then, the mixture was dehydrated for 30 min under the condition of 130° C., 1.3 kPa. Next, the temperature was raised to 155° C. To the resulting reaction mixture, 110.1 g of EO was added for the reaction (corresponding to one mole of EO per one mole glycerin). The reaction condition was, temperature at 155° C. and pressure of 0.1 to 0.3 Mpa (gauge pressure). Upon the completion of the reaction, temperature was cooled down to 80° C. to obtain an adduct having on average one mole of EO per glycerin. The EO distribution for the present Preparation Example was as follows; unreacted glycerin (EO=0 mole): 36.1%, EO=1 mole: 37.0%, EO=2 moles: 19.1%, EO=3 moles: 6.1%, EO=4 moles: 1.3%, EO=5 moles: 0.2% (% is based on weight and it is the same for the rest).

Preparation Example 2

Preparation of an Adduct Having on Average 3 Moles of EO Per Glycerin

An adduct having on average 3 moles of EO per glycerin was obtained basically in the same manner as Preparation Example 1, except for using 330.5 g of EO for the reaction with glycerin (corresponding to 3 moles of EO per one mole glycerin). In addition, the EO distribution for the present Preparation Example was as follows; unreacted glycerin (EO=0 mole): 2.9%, EO=1 mole: 11.3%, EO=2 moles: 22.4%, EO=3 moles: 26.1%, EO=4 moles: 19.7%, EO=5 moles: 10.7%, EO=6 moles: 4.6%, EO=7 moles: 1.7%, EO=8 moles: 0.5%, EO=9 moles: 0.2%.

Preparation Example 3

Preparation of an Adduct Having on Average 6 Moles of EO Per Glycerin

An adduct having on average 6 moles of EO per glycerin was obtained basically in the same manner as Preparation Example 1, except for using 661.0 g of EO for the reaction with glycerin (corresponding to 6 moles of EO per one mole glycerin).

Preparation Example 4

Preparation of an Adduct Having on Average 9 Moles of EO Per Glycerin

An adduct having on average 9 moles of EO per glycerin was obtained basically in the same manner as Preparation Example 1, except for using 991.4 g of EO for the reaction with glycerin (corresponding to 9 moles of EO per one mole glycerin). In addition, the EO distribution for the present Preparation Example was as follows; EO=3 moles: 0.2%, EO=4 moles: 1.2%, EO=5 moles: 3.6%, EO=6 moles: 7.2%, EO=7 moles: 11.2%, EO=8 moles: 14.5%, EO=9 moles: 15.9%, EO=10 moles: 15.0%, EO=11 moles: 12.3%, EO=12 moles: 8.9%, EO=13 moles: 5.4%, EO=14 moles: 2.9%, EO=15 moles: 1.1%, EO=16 moles: 0.1%.

Preparation Example 5

Preparation of an Adduct Having on Average One Mole of PO Per Glycerin

To a 2-liter autoclave, glycerin and KOH were added (230.3 g and 4.2 g, respectively) and the temperature was raised to 130° C. while stirring at a speed of about 600 rpm. Then, the mixture was dehydrated for 30 min under the condition of 130° C., 1.3 kPa. To the resulting reaction mixture, 145.2 g of PO was added for the reaction (corresponding to one mole of PO per one mole glycerin). The reaction condition was, temperature at 130° C. and pressure of 0.1 to 0.3 Mpa (gauge pressure). Upon the completion of the reaction, temperature was cooled down to 80° C. to obtain an adduct having on average one mole of PO per glycerin. The PO distribution for the present Preparation Example was as follows; unreacted glycerin (PO=0 mole): 26.3%, PO=1 mole: 44.0%, PO=2 moles: 23.9%, PO=3 moles: 4.6%, PO=4 moles: 0.2%.

Preparation Example 6

Preparation of an Adduct Having on Average 6 Moles of PO Per Glycerin

An adduct having on average 6 moles of PO per glycerin was obtained basically in the same manner as Preparation Example 5, except for using 7.0 g of KOH and 871.5 g of PO for the reaction with glycerin (corresponding to 6 moles of PO per one mole glycerin). In addition, the PO distribution for the present Preparation Example was as follows; PO=3 moles: 2.6%, PO=4 moles: 5.6%, PO=5 moles: 22.6%, PO=6 moles: 24.6%, PO=7 moles: 19.3%, PO=8 moles: 11.2%, PO=9 moles: 4.8%, PO=10 moles: 1.5%, PO=11 moles: 0.1%.

Preparation Example 7

Preparation of an Adduct Having on Average 9 Moles of PO Per Glycerin

An adduct having on average 9 moles of PO per glycerin was obtained basically in the same manner as Preparation Example 5, except for using 7.0 g of KOH and 1307.2 g of PO for the reaction with glycerin (corresponding to 9 moles of PO per one mole glycerin). In addition, the PO distribution for the present Preparation Example was as follows; PO=4 moles: 0.2%, PO=5 moles: 1.8%, PO=6 moles: 2.5%, PO=7 moles: 10.6%, PO=8 moles: 18.0%, PO=9 moles: 22.1%, PO=10 moles: 19.6%, PO=11 moles: 13.1%, PO=12 moles: 3.7%, PO=13 moles: 2.4%, PO=14 moles: 0.4%.

(1-2) Blending Quantity

Clinker: 1,000 g

Dihydrate gypsum: 38.5 g, the amount of added $SO_3$ was adjusted to 1.7% (1,000 g×1.7%/44.13%=38.5 g)

Grinding aid: Compound of Table 1 was used as 50% by weight aqueous solution (1-3) Ball Mill AXB-15 manufactured by SEIWA GIKEN Co., Ltd. was used. Ceramic pot volume was 15 liter (outer diameter 300 mm) and zirconia ball in total weight of 10.2 kg was used (38 mmΦ, 6.8 kg; 32 mmΦ, 2.2 kg and; 30 mmΦ, 1.3 kg). Revolution number of the ball mill was 38 rpm. In addition, time for releasing ground materials during grinding process was adjusted to 1 minute.

(1-4) Time to Reach Ground State

Target Blaine value was $3,300 \pm 100$ cm$^2$/g. Blaine values were measured at 30 min, 45 min, 60 min, 75 min, and 90 min after the start of grinding. Then, time required for reaching target Blaine value of $3,300 \pm 100$ cm$^2$/g was obtained by secondary regression equation and it was defined as a final reaching time (time to reach ground state). In addition, for the measurement of Blaine value, the apparatus for Blaine air penetration, that is designated by a physical method for testing cement (JIS R 5201), was used. The difference among the time to reach ground state obtained from this test is more significant at actual equipment level. The evaluation was carried out by obtaining relative values compared to the time to reach ground state in Comparative Example 1-1 that had been standardized to 100. When relative value was 90 or less, it is indicated as ⌈◉⌋, ⌈○⌋ is for the value more than 90 to 95, ⌈Δ⌋ is for the value more than 95 to 98, and ⌈x⌋ is for the value more than 98. According to the evaluation, the time to reach ground state was 114 min for Comparative Example 1-1. Comparative Example 1-1 was described as a 'standard' in Table 1.

(1-5) Strength Test

Strength test was carried out in accordance with a physical method for testing cement (JIS R 5201) appendix 2 (Method for testing cement—Measurement of strength). The used cement was the one obtained above having Blaine value of 3,300±100 cm$^2$/g. The evaluation was carried out by obtaining relative values to the compressive strength in Comparative Example 1-1 that had been standardized to 100. When relative value was more than 110, it is indicated as ⌈◉⌋, ⌈○⌋ is for the value more than 90 to 110, and ⌈x⌋ is for the value 90 or less. According to the evaluation, compressive strength obtained for Comparative Example 1-1 was 30.6N/mm$^2$ and 44.1N/mm$^2$ after three days and seven days, respectively. Comparative Example 1-1 was described as a 'standard' in Table 1.

Safety and Health Law, or (iii) a material that is considered to be important regarding the short-term exposure influence according to International Chemical Safety Card, it is indicated as ⌈x⌋ while a material which is not corresponding to any of the (i) to (iii) is indicated as ⌈○⌋ (it remains the same for the rest).

Further, with respect to the viscosity described in the table, it was measured for a corresponding material (100% product) in terms of easy handling and grinding efficiency resulting from diffusivity when the process is scaled-up. When the viscosity is 1,000 mPa·s or less, it is indicated as ⌈○⌋. On the other hand, when the viscosity is more than 1,000 mPa·s, it is indicated as ⌈x⌋ (it remains the same for the rest). Conditions for measuring viscosity are the same as those described above (it remains the same for the rest).

(1-6) Deterioration Test for Cement

In order to evaluate the suppressing effect on cement deterioration, cements that had been obtained from some of Examples and Comparative Examples were sealed in a heatproof glass vessel and stored in an incubator at 70° C. for 6 days. Mortar compressive strength was compared for the each cement before and after the storage in accordance with a physical method for testing cement (JIS R 5201) appendix 2

TABLE 1

|  |  | Grinding aid | | | Time to reach | Compressive strength | |
|---|---|---|---|---|---|---|---|
|  | Kind | Added amount (wt %) | Safety | Viscosity | Time to reach 3300 cm$^2$/g | After 3 days | After 7 days |
| Comparative example | 1-1 — | — | — | — | Standard | Standard | Standard |
|  | 1-2 Diethyleneglycol | 0.02 | X | ○ | ○ | ○ | ○ |
|  | 1-3 Diethyleneglycol | 0.04 | X | ○ | ○ | ◉ | ○ |
|  | 1-4 Triethanolamine | 0.04 | X | ○ | ○ | ○ | ○ |
|  | 1-5 Glycerin | 0.04 | ○ | X | ○ | ○ | ○ |
| Example | 1-1 Glycerin EO adduct(EOp = 1) | 0.04 | ○ | ○ | ◉ | ◉ | ◉ |
|  | 1-2 Glycerin EO adduct(EOp = 3) | 0.01 | ○ | ○ | Δ | ○ | ○ |
|  | 1-3 Glycerin EO adduct(EOp = 3) | 0.02 | ○ | ○ | ○ | ○ | ○ |
|  | 1-4 Glycerin EO adduct(EOp = 3) | 0.04 | ○ | ○ | ◉ | ○ | ○ |
|  | 1-5 Glycerin EO adduct(EOp = 6) | 0.04 | ○ | ○ | ○ | ○ | ○ |
|  | 1-6 Glycerin EO adduct(EOp = 9) | 0.04 | ○ | ○ | ○ | ○ | ○ |
|  | 1-7 Glycerin PO adduct(POp = 1) | 0.04 | ○ | ○ | ○ | ○ | ○ |
|  | 1-8 Glycerin PO adduct(POp = 6) | 0.04 | ○ | ○ | ○ | ○ | ○ |
|  | 1-9 Glycerin PO adduct(POp = 9) | 0.04 | ○ | ○ | ○ | ○ | ○ |

In the table, EOp represents average added mole number of ethyleneoxide and POp represents average added mole number of propyleneoxide (it remains the same for the rest). In addition, for Comparative Example 1-1, only water was added in an amount of 0.04% by weight to clinker weight. In the table, the additive amount indicates an amount of a compound in % by weight to clinker weight (it remains the same for the rest).

With respect to the safety described in the table, when the material is (i) a PRTR subject material, (ii) a material required to be notified in accordance with Article 57, Section 2 of (Method for testing cement-Measurement of strength). It is considered that, in the storage silo, the above described storage by sealing was such that cement could be easily weathered by moisture released from binding water of dihydrate gypsum contained in cement. Results are given in Table 2. The evaluation was based on the rate of reduction of the compressive strength that has been obtained from the deterioration test before and after the storage. When the rate of reduction was 6% or less, it is indicated as ⌈◉⌋, ⌈○⌋ is for the rate more than 6 to 12%, and ⌈x⌋ is for the rate more than 12%.

TABLE 2

|  |  | Grinding aid | Compressive strength after storing at 70° C. | |
|---|---|---|---|---|
|  | Kind | Added amount (wt %) | After 3 days | After 7 days |
| Comparative example | 1-1 — | — | ○ | X |
|  | 1-3 Diethyleneglycol | 0.04 | ○ | X |
|  | 1-5 Glycerine | 0.04 | ○ | ○ |

TABLE 2-continued

| | | Grinding aid | | Compressive strength after storing at 70° C. | |
|---|---|---|---|---|---|
| | | Kind | Added amount (wt %) | After 3 days | After 7 days |
| Example | 1-1 | Glycerin EO adduct (EOp = 1) | 0.04 | ⊚ | ⊚ |
| | 1-4 | Glycerine EO adduct (EOp = 3) | 0.04 | ⊚ | ⊚ |
| | 1-5 | Glycerin EO adduct(EOp = 6) | 0.04 | ○ | ⊚ |
| | 1-6 | Glycerin EO adduct (EOp = 9) | 0.04 | ○ | ⊚ |

From the results of Table 2, it is found that the compressive strength before and after the storage, especially the compressive strength after seven days of the storage, showed smaller change (i.e., less reduction of strength) for Examples 1-1 and 1-4 to 1-6 wherein the grinding was carried out according to the method of the present invention, compared to Comparative Examples 1-1, 1-3 and 1-5. Thus, it is clear that the grinding aid of the present invention can suppress the reduction of strength of cement that is caused by deterioration.

Example 2 and Comparative Example 2

Materials as described below are prepared in blending quantity as described below and added at once, and then ground by ball mill. In this case, grinding efficiency (time to reach ground state) and strength test of thus-obtained cement were evaluated as described below. Results are given in Table 3.

(2-1) Used Materials

It is the same as those of Example 1 and Comparative Example 1 (except that the viscosity of some grinding aids was measured in a mixture).

(2-2) Blending Quantity

It is the same as those of Example 1 and Comparative Example 1.

(2-3) Ball Mill

AXB-15 manufactured by SEIWA GIKEN Co., Ltd. was used. Stainless pot volume was 18 liter (outer diameter 300 mm) and stainless balls in total number of 140 were used (70 balls having diameter of 30 mmΦ:nominal outside diameter 1·3/16, 70 balls having diameter of 20 mmΦ:nominal outside diameter 3/4). Revolution number of the ball mill was 45 rpm. In addition, time for releasing ground materials during grinding process was adjusted to 1 minute.

(2-4) Time to Reach Ground State

Target Blaine value was 3,300±100 cm$^2$/g, and 60 min, 75 min, and 90 min after the start of grinding Blaine value was measured. Then, time required for reaching target Blaine value of 3,300 cm$^2$/g was obtained by secondary regression equation and it was defined as a final reaching time (time to reach ground state). In addition, for the measurement of Blaine value, the apparatus for Blaine air penetration, that is designated by a physical method for testing cement (JIS R 5201), was used. The difference among the time to reach ground state obtained from this test is more significant at actual equipment level. The evaluation was carried out by obtaining relative values compared to the time to reach ground state in Comparative Example 2-1 that had been standardized to 100. When relative value was 90 or less, it is indicated as [⊚], [○] is for the value more than 90 to 95, [Δ] is for the value more than 95 to 98, and [x] is for the value more than 98. According to the evaluation, the time to reach ground state was 124 min for Comparative Example 2-1. Comparative Example 2-1 was described as a 'standard' in Table 3.

(2-5) Strength Test

Strength test was carried out in accordance with a physical method for testing cement (JIS R 5201) appendix 2 (Method for testing cement—Measurement of strength). The used cement was the one obtained above having Blaine value of 3,300±100 cm$^2$/g. The evaluation was carried out by obtaining relative values compared to the compressive strength in Comparative Example 2-1 that had been standardized to 100. When relative value was more than 110, it is indicated as [⊚], [○] for the value more than 90 to 110, and [x] is for the value 90 or less. According to the evaluation, compressive strength obtained for Comparative Example 2-1 was 29.9N/mm$^2$ and 44.2/mm$^2$ after three days and seven days, respectively. Comparative Example 2-1 was described as a 'standard' in Table 3.

(2-6) Deterioration Test for Cement

It is the same as those of Example 1 and Comparative Example 1.

TABLE 3

| | | Grinding aid | | | | Time to reach ground state | Compressive strength | | Compressive strength after storing at 70° C. | |
|---|---|---|---|---|---|---|---|---|---|---|
| | | Kind | Added amount (wt %) | Safety | Viscosity | Time to reach 3300 cm$^2$/g | After 3 days | After 7 days | After 3 days | After 7 days |
| Comparative example | 2-1 | — | — | — | — | Standard | Standard | Standard | ○ | X |
| | 2-2 | Diethyleneglycol | 0.04 | X | ○ | ⊚ | ⊚ | ○ | ○ | X |
| | 2-3 | Glycerin | 0.04 | ○ | X | ⊚ | ○ | ○ | ○ | ○ |
| | 2-4 | Diglycerin | 0.04 | ○ | X | X | ⊚ | ⊚ | ○ | ○ |
| Example | 2-1 | Glycerin EO adduct (EOp = 1) | 0.04 | ○ | ○ | ⊚ | ⊚ | ⊚ | ⊚ | ⊚ |
| | 2-2 | Glycerin EO adduct (EOp = 3) | 0.04 | ○ | ○ | ⊚ | ○ | ○ | ⊚ | ⊚ |
| | 2-3 | Diglycerin EO adduct (EOp = 4) | 0.04 | ○ | X | ⊚ | ○ | ○ | ○ | ⊚ |
| | 2-4 | Diglycerin PO adduct (POp = 4) | 0.04 | ○ | X | ⊚ | ○ | ○ | ○ | ⊚ |
| | 2-5 | Tetraglycerin EO adduct (EOp = 6) | 0.04 | ○ | X | ⊚ | ○ | ○ | ○ | ⊚ |

TABLE 3-continued

| | Grinding aid | | | | Time to reach ground state | Compressive strength | | Compressive strength after storing at 70° C. | |
|---|---|---|---|---|---|---|---|---|---|
| | Kind | Added amount (wt %) | Safety | Viscosity | Time to reach 3300 cm²/g | After 3 days | After 7 days | After 3 days | After 7 days |
| 2-6 | Glycerin/Glycerin EO adduct (EOp = 1) = 50/50 (weight ratio) | 0.04 | ○ | ○ | ◎ | ◎ | ◎ | ◎ | ◎ |
| 2-7 | Glycerin/Glycerin EO adduct (EOp = 1) = 25/75 (weight ratio) | 0.04 | ○ | ○ | ◎ | ◎ | ◎ | ◎ | ◎ |
| 2-8 | Glycerin/Glycerin EO adduct (EOp = 3) = 50/50 (weight ratio) | 0.04 | ○ | ○ | ◎ | ○ | ○ | ◎ | ◎ |
| 2-9 | Diethyleneglycol/Glycerin EO adduct (EOp = 1) = 50/50 (weight ratio) | 0.04 | △ | ○ | ◎ | ◎ | ◎ | ◎ | ○ |
| 2-10 | Diethyleneglycol/Glycerin EO adduct (EOp = 1) = 25/75 (weight ratio) | 0.04 | △ | ○ | ◎ | ◎ | ◎ | ◎ | ○ |

In the table, only water was added in an amount of 0.04% by weight to clinker weight for Comparative Example 2-1.

Example 3 and Comparative Example 3

Herein below, examples directed to the combined use of anti-foaming agent (b) are described.

Materials as described below are prepared in blending quantity as described below and added at once, and then ground by ball mill. In this case, grinding efficiency (time to reach ground state) and strength test of thus-obtained cement were evaluated as described below.

(3-1) Used Materials were the Same as Those Described in (1-1).

However, a grinding aid was further used.

Grinding aid: Compound (a) (see, Table 4 and Preparation Examples described below) and anti-foaming agent (b) (see, Table 5)

Preparation Example 8

Preparation of an Adduct Having on Average 3 Moles of EO Per Glycerin

To a 2-liter autoclave, glycerin and KOH were added (230.3 g and 1.4 g, respectively) and the temperature was raised to 130° C. while stirring at a speed of about 600 rpm. Then, the mixture was dehydrated for 30 min under the condition of 130° C., 1.3 kPa. Next, the temperature was raised to 155° C. To the resulting reaction mixture, 330.5 g of EO was added for the reaction (corresponding to 3 moles of EO per one mole glycerin). The reaction condition was, temperature at 155° C. and pressure of from 0.1 to 0.3 Mpa (gauge pressure). After the completion of the reaction, temperature was cooled down to 80° C. to obtain an adduct having on average 3 moles of EO per glycerin, Example 3-1. The EO distribution for the present Preparation Example was as follows; unreacted glycerin (EO=0 mole): 2.9%, EO=1 mole: 11.3%, EO=2 moles: 22.4%, EO=3 moles: 26.1%, EO=4 moles: 19.7%, EO=5 moles: 10.7%, EO=6 moles: 4.6%, EO=7 mole: 1.7%, EO=8 moles: 0.5%, EO=9 moles: 0.2% (% is based on weight and it is the same for the rest).

Preparation Example 9

Preparation of an Adduct Having on Average 6 Moles of EO Per Glycerin

An adduct having on average 6 moles of EO per glycerin was obtained basically in the same manner as Preparation Example 8, except for using 661.0 g of EO for the reaction with glycerin (corresponding to 6 moles of EO per one mole glycerin).

Preparation Example 10

Preparation of an Adduct Having on Average 9 Moles of EO Per Glycerin

An adduct having on average 9 moles of EO per glycerin was obtained basically in the same manner as Preparation Example 8, except for using 991.4 g of EO for the reaction with glycerin (corresponding to 9 moles of EO per one mole glycerin). In addition, the EO distribution for the present Preparation Example was as follows; EO=3 moles: 0.2%, EO=4 moles: 1.2%, EO=5 moles: 3.6%, EO=6 moles: 7.2%, EO=7 moles: 11.2%. EO=8 moles: 14.5%, EO=9 moles: 15.9%, EO=10 moles: 15.0%, EO=11 mole: 12.3%, EO=12 moles: 8.9%, EO=13 moles: 5.4%, EO=14 moles: 2.9%, EO=15 moles: 1.1%, EO=16 moles: 0.1%.

Preparation Example 11

Preparation of an Adduct Having on Average 6 Moles of PO Per Glycerin

To a 2-liter autoclave, glycerin and KOH were added (230.3 g and 7.0 g, respectively) and the temperature was raised to 130° C. while stirring at a speed of about 600 rpm. Then, the mixture was dehydrated for 30 min under the condition of 130° C., 1.3 kPa. To the resulting reaction mixture, 871.5 g of PO was added for the reaction (corresponding to 6 moles of PO per one mole glycerin). The reaction condition was, temperature at 130° C. and pressure of from 0.1 to 0.3 Mpa (gauge pressure). After the completion of the reaction, temperature was cooled down to 80° C. to obtain an adduct having on average 6 moles of PO per glycerin. The PO distribution for the present Preparation Example was as follows; PO=3 moles: 2.6%, PO=4 moles: 5.6%, PO=5 moles: 22.6%, PO=6 moles: 24.6%, PO=7 moles: 19.3%, PO=8 moles: 11.2%, PO=9 moles: 4.8%, PO=10 moles: 1.5%, PO=11 moles: 0.1%.

Preparation Example 12

Preparation of an Adduct Having on Average 4 Moles of EO Per Diglycerin

An adduct having on average 4 moles of EO per diglycerin was obtained basically in the same manner as Preparation Example 8, except that glycerin was substituted with diglycerin and 0.8 g of KOH and 249.3 g of diglycerin were added, and 198.2 g of EO was used for the reaction with diglycerin (i.e., corresponding to 4 moles of EO per one mole diglycerin). In addition, the EO distribution for the present Preparation Example was as follows; unreacted diglycerin (EO=0 mole): 1.8%, EO=1 mole: 10.4%, EO=2 moles: 19.2%, EO=3 moles: 23.1%, EO=4 moles: 25.5%, EO=5 moles: 15.4%, EO=6 moles: 3.5%, EO=7 moles: 0.6%, EO=8 moles: 0.4%, EO=9 moles: 0.1%.

(3-2) Blending quantity is the same as that of (1-2) above. However, the mixture including compound (a) and anti-foaming agent (b) mixed in composition described in Table 6 was used as 50% by weight aqueous solution.

(3-3) Ball mill is the same as (2-3) above.

(3-4) Time to reach ground state is basically the same as (2-4) above. The evaluation was carried out by obtaining relative values compared to the time to reach ground state in Comparative Example 3-1 that had been standardized to 100. When relative value was 90 or less, it is indicated as ⌈◎⌋, ⌈○⌋ is for the value more than 90 to 95, ⌈Δ⌋ is for the value more than 95 to 98, and ⌈x⌋ is for the value more than 98. According to the evaluation, the time to reach ground state was 124 min for Comparative Example 3-1. Comparative Example 3-1 was described as a 'standard' in Table 6.

(3-5) Test for measuring strength is basically the same as (2-5) above. The evaluation was carried out by obtaining relative values compared to the compressive strength in Comparative 3-1 that had been standardized to 100. When relative value was more than 110, it is indicated as ⌈◎⌋, ⌈○⌋ is for the value more than 100 to 110 or less, ⌈Δ⌋ is for the value more than 90 to 100 or less, and ⌈x⌋ is for the value 90 or less. According to the evaluation, compressive strength obtained for Comparative Example 3-1 was 29.9N/mm$^2$ and 44.2N/mm$^2$ after three days and seven days, respectively. Comparative Example 3-1 was described as a 'standard' in Table 6.

(3-6) Test for deterioration of cement is basically the same as (1-6) above. Results are summarized in Table 6.

TABLE 4

| | Compound(a) |
|---|---|
| A-1 | Glycerin EO adduct(EOp = 3) |
| A-2 | Glycerin EO adduct(EOp = 6) |
| A-3 | Glycerin EO adduct(EOp = 9) |
| A-4 | Glycerin PO adduct(POp = 6) |
| A-5 | Diglycerin EO adduct(EOp = 4) |
| A-6 | Diethyleneglycol mono n-butyl ether[BDG-C, Nippon Nyukazai Co., Ltd.] |

TABLE 5

| | Anti-foaming agent(b) |
|---|---|
| B-1 | Silicone anti-foaming agent [TSA-770, Momentive Performance Materials Japan LLC] |
| B-2 | Silicone anti-foaming agent[FS Anti-foam 013A, Daw Corning Toray Co., Ltd.] |
| B-3 | Fatty acid ester anti-foaming agent[Foamlex 797, NICCA CHEMICAL Co., Ltd.] |
| B-4 | Ether anti-foaming agent [anti-foaming agent No. 8, Kao Corporation] |
| B-5 | Ether anti-foaming agent [Foamaster PC, San Nopco Limited.] |
| B-6 | Ether anti-foaming agent [Adeka Pluronic 25R-2, ADEKA Corporation] |

TABLE 6

| | | Grinding aid | | | Time to reach | Strength test | | Cement deteroration test | |
|---|---|---|---|---|---|---|---|---|---|
| | | Compound (a) | Anti-foaming agent (b) | (a)/(b) (weight ratio) | Added amount (wt %) | Time to reach ground state 3300 cm$^2$/g | Strength after 3 days | Strength after 7 days | Strength after 3 days | Strength after 7 days |
| Comparative example | 3-1 | — | — | — | — | Standard | Standard | Standard | ○ | X |
| Example | 3-1 | A-1 | — | 100/0 | 0.04 | ◎ | ○ | ○ | ◎ | ◎ |
| | 3-2 | A-2 | — | 100/0 | 0.04 | ◎ | Δ | Δ | ○ | ◎ |
| | 3-3 | A-3 | — | 100/0 | 0.04 | ○ | Δ | Δ | ○ | ◎ |
| | 3-4 | A-4 | — | 100/0 | 0.04 | ◎ | Δ | Δ | ○ | ◎ |
| | 3-5 | A-5 | — | 100/0 | 0.04 | ◎ | Δ | Δ | ○ | ◎ |
| | 3-6 | A-1 | B-3 | 90/10 | 0.04 | ◎ | ◎ | ◎ | ◎ | ◎ |
| | 3-7 | A-2 | B-3 | 90/10 | 0.04 | ◎ | ◎ | ○ | ◎ | ◎ |
| | 3-8 | A-3 | B-3 | 90/10 | 0.04 | ○ | ○ | ○ | ◎ | ◎ |
| | 3-9 | A-4 | B-3 | 90/10 | 0.04 | ◎ | ○ | ○ | ◎ | ◎ |
| | 3-10 | A-5 | B-3 | 90/10 | 0.04 | ◎ | ○ | ○ | ◎ | ◎ |
| | 3-11 | A-6 | B-3 | 90/10 | 0.04 | ○ | ○ | ○ | ○ | ○ |
| | 3-12 | A-2 | B-1 | 90/10 | 0.04 | ◎ | ◎ | ○ | ◎ | ◎ |
| | 3-13 | A-2 | B-2 | 90/10 | 0.04 | ◎ | ◎ | ○ | ◎ | ◎ |
| | 3-14 | A-2 | B-4 | 90/10 | 0.04 | ◎ | ◎ | ○ | ◎ | ◎ |
| | 3-15 | A-2 | B-5 | 90/10 | 0.04 | ◎ | ◎ | ○ | ◎ | ◎ |
| | 3-16 | A-2 | B-6 | 90/10 | 0.04 | ◎ | ◎ | ○ | ◎ | ◎ |
| | 3-17 | A-2 | B-3 | 95/5 | 0.04 | ◎ | ○ | ○ | ◎ | ◎ |
| | 3-18 | A-2 | B-3 | 80/20 | 0.04 | ◎ | ◎ | ○ | ◎ | ◎ |
| | 3-19 | A-2 | B-3 | 70/30 | 0.04 | ◎ | ◎ | ○ | ◎ | ◎ |
| | 3-20 | A-2 | B-3 | 60/40 | 0.04 | ○ | ◎ | ○ | ◎ | ◎ |

For Comparative Example 3-1, only water was added in an amount of 0.04% by weight to clinker weight. In the table, the additive amount is an effective amount of the grinding aid relative to the clinker.

From the results of Table 6, it is found that the combined use of compound (a) and anti-foaming agent (b) showed better effect in the strength test and cement deterioration test compared to the use of compound (a) alone. That is, when Example 3-1 and Example 3-6, in which the same compound (a) were used, are compared to each other, it is found that the strength is more improved after three days or seven days in Example 3-6 wherein anti-foaming agent (b) was additionally used. The same tendency is also found from the comparison between Examples 3-2 to 3-5 and Examples 3-7 to 3-10.

The invention claimed is:

1. A method for preparing a hydraulic powder, comprising a step of grinding a hydraulic compound in the presence of compound (a) that is obtained by adding an alkyleneoxide having 2 to 4 carbon atoms to a compound which has no amino group, but has an active hydrogen, provided that polyethyleneglycol and polypropyleneglycol are excluded, wherein
the compound (a) is a compound that is obtained by adding 0.5 to 3 moles on the average of alkyleneoxides to 1 mole of the compound having an active hydrogen, and
the compound (a) is an adduct of ethyleneoxide to glycerin.

2. A method for preparing a hydraulic powder, comprising a step of grinding a hydraulic compound in the presence of compound (a), that is obtained by adding an alkyleneoxide having 2 to 4 carbon atoms to a compound which has no amino group, but has an active hydrogen, provided that polyethyleneglycol and polypropyleneglycol are excluded, and an anti-foaming agent (b), wherein
the compound (a) is an adduct of ethyleneoxide to glycerin.

3. The method for preparing a hydraulic powder according to claim 1 or 2, wherein the compound (a) has a viscosity of 1,000 mPa·s or less at 25° C.

4. The method for preparing a hydraulic powder according to claim 1, wherein the compound (a) is used in an amount of 0.001 to 0.2 part by weight to 100 parts by weight of the hydraulic compound.

5. The method for preparing a hydraulic powder according to claim 1, wherein the hydraulic compound is ground also in the presence of glycerin.

6. The method for preparing a hydraulic powder according to claim 2, wherein the compound (a) is a compound that is obtained by adding 2 to 30 moles on the average of alkyleneoxides to 1 mole of the compound having an active hydrogen.

* * * * *